M. C. BRIGHT.
ADJUSTABLE FLOAT FEED.
APPLICATION FILED AUG. 11, 1909.
1,019,943.
Patented Mar. 12, 1912.
2 SHEETS—SHEET 1.
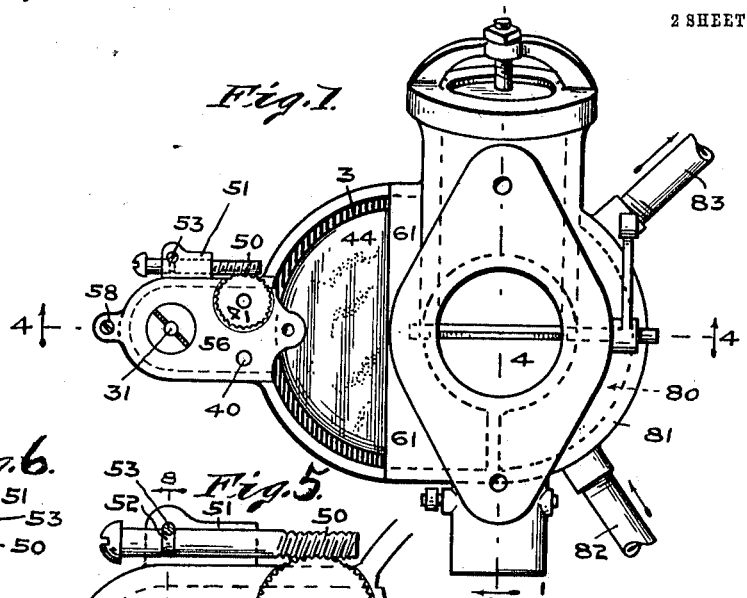
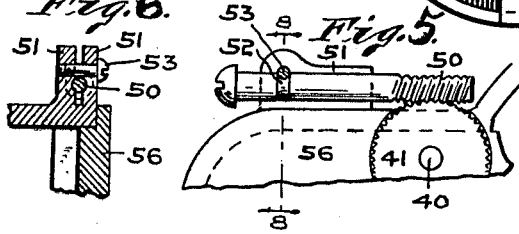
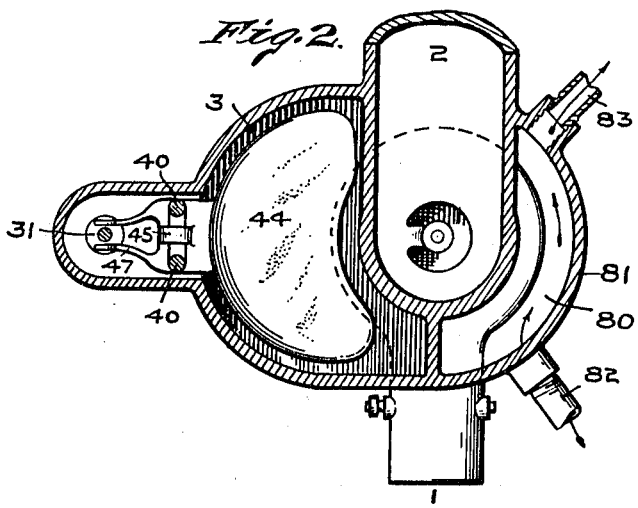
WITNESSES:
L. B. Woerner
Wm Hurte
INVENTOR
Martin C. Bright,
By Minturn & Woerner
ATT'YS.

M. C. BRIGHT.
ADJUSTABLE FLOAT FEED.
APPLICATION FILED AUG. 11, 1909.
1,019,943.
Patented Mar. 12, 1912.
2 SHEETS—SHEET 2.
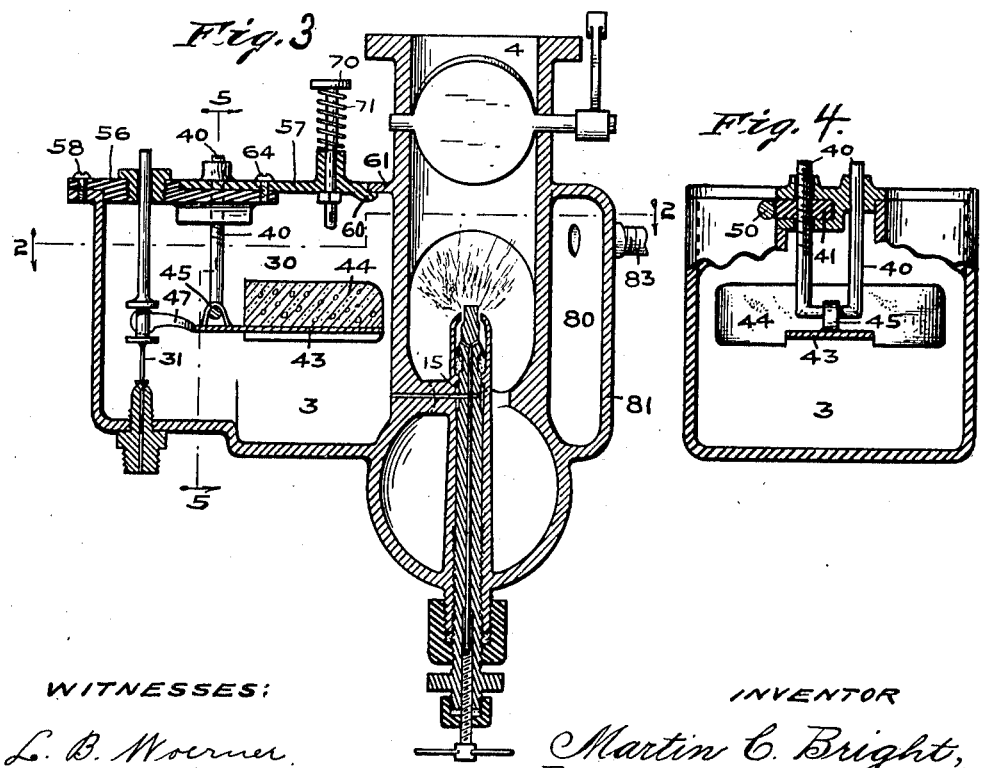
WITNESSES:
L. B. Woerner.
Wm Hurte.
INVENTOR
Martin C. Bright,
By
Wintum Woerner,
ATT'YS.

UNITED STATES PATENT OFFICE.

MARTIN C. BRIGHT, OF INDIANAPOLIS, INDIANA, ASSIGNOR OF ONE-HALF TO CHARLES W. MEIKEL, OF INDIANAPOLIS, INDIANA.

ADJUSTABLE FLOAT-FEED.

1,019,943.  Specification of Letters Patent.  Patented Mar. 12, 1912.

Application filed August 11, 1909. Serial No. 512,417.

*To all whom it may concern:*

Be it known that I, MARTIN C. BRIGHT, a citizen of the United States, residing at Indianapolis, in the county of Marion and State of Indiana, have invented certain new and useful Improvements in Adjustable Float-Feeds, of which the following is a specification.

This invention relates to carbureters for internal combustion engines; and the invention has for its object certain means for adjusting the mounting of the float to overcome wear so that the oil level can be uniformly maintained and the flooding of the carbureter prevented.

I accomplish the objects of the invention by means of the float feed mechanism illustrated in the accompanying drawings, forming a part hereof, in which—

Figure 1 is a top or plan view of the carbureter with the exception that the cover for the float chamber is removed. Fig. 2 is a horizontal section on the line 2—2 in Fig. 3. Fig. 3 is a central vertical section on the line 4—4 in Fig. 1. Fig. 4 is a cross section of the float chamber on the line 5—5 in Fig. 3. Fig. 5 is an enlarged detail view of the means for adjusting the float. Fig. 6 is a cross section on the line 8—8 in Fig. 5.

In the drawings, 1 represents the primary air intake; 2 the auxiliary or secondary air intake; 3 the float chamber, and 4 the outlet port through which the combustible vapor passes to the engine and all being arranged within the carbureter body.

The carbureter is provided with the usual float chamber 3 to provide a quantity of oil in close proximity to the point of consumption, and includes the usual float 30 and the valve 31 which control the flow of oil into said float chamber. While the float chambers are common to carbureters, it will be noted, in this instance, that the float chamber occupies a position to one side so as to embrace only about one-half of the mixing chamber, and the object of this will be hereinafter described.

As oil is being constantly consumed when the engine is running, and as this oil is supplied from the float chamber which has a tendency to reduce the oil level within said chamber, the float is kept in constant agitation to actuate the valve 31, which controls the inflow of oil. This continual movement of the float is such that within a short time the hanger therefor becomes perceptibly worn, allowing the float too much play which causes an irregular movement of the valve 31, so that an excess of oil is admitted to the float chamber and nozzle, through which the spraying efficiency of said nozzle is greatly affected if not entirely destroyed, while the flooding of the carbureter is of common occurrence. To remedy these defects is to be able to take up such wear as occurs to the pivot upon which the float is mounted, thereby maintaining the latter in normal position and, withal, to provide a uniform level of oil in both the float chamber and nozzle, to maintain the efficiency of the carbureter. This I accomplish by mounting the float upon a movable and vertically disposed support in the form of a U-shaped rod 40. One of the free ends of this support is provided with threads and passes through a gear wheel 41, while the opposite free end of the support is left smooth and passes through the lid of the float chamber and serves as a guide to prevent the support from turning.

The float comprises a plate 43 upon which the cork 44 is mounted.

45 represents the hanger which is secured to the plate 43 and is provided with an aperture through which extends the horizontal portion of the support 40. The plate 43 is provided with the arms 47 which engage and actuate the valve-stem 31 which controls the inlet of the oil to the float chamber 3. It will be noted that by rotating the gear wheel 41 the support 40 and the float are raised or lowered.

To make the parts easily accessible, and to impart any degree of adjustment to the float that may be desired, and to lock the parts when adjusted, I provide the screw-shaft 50. This screw-shaft passes between the lugs 51 integrally formed on the side of the carbureter body and is provided with threads which engage the teeth in the periphery of the gear wheel 41. The screw-shaft 50 is provided with an annular groove 52, and by means of a transverse clamping screw 53 which projects through said groove and the lugs 51 the said screw-shaft 50 is prevented from moving longitudinally and may be locked by setting the screw 53 so as to tightly clamp the lugs 51 against the surface of the screw-shaft 50, when the proper adjustment is completed.

It will be noted by examining Fig. 3 that the cover for the float chamber is formed of two members, 56 and 57. The part 56 is first set into position, as shown in Fig. 1, and is held tightly upon the side wall of the float chamber by means of the screw 58. The member 56 provides the bearing for the valve-stem 31, the hanger 45 and the gear wheel 41. The remaining portion of the float chamber is closed by means of the member 57. This member is provided with one or more lips 60 which project under the projecting ledge 61 of the carbureter body and the opposite end is made fast to the member 56 by means of the screw 64. It will be noted, under ordinary circumstances, that if it is desired to investigate the interior of the float chamber it is only necessary to remove the screw 64 which frees the member 57 and allows it to be removed. This leaves the float exposed, substantially as shown in Fig. 1, and may be sufficient for the time being.

If, for any cause, it is desired to remove the float 30 and the valve 31, it may easily be accomplished by removing the screw 58 which allows the member 56 of the cover with the float and the valve to be removed as an entirety so that repairs can be made without removing the entire carbureter from its mounting. The member 57 of the cover also carries the vertically disposed and movably mounted rod 70 which is held normally in its elevated position by means of a spring 71, and the purpose of this rod is to enable the float to be depressed at the will of the operator and thereby provide a primer if circumstances should require it.

As has heretofore been pointed out in the specification, it will be noted that the float chamber extends only a part of the way around the mixing chamber. This construction leaves the opposite side wall of the mixing chamber free. Around this side of the said chamber I form a water chamber 80 by means of the outer wall 81. A pipe 82 leads from the engine (not shown) and communicates with the chamber 80 near the bottom and a second pipe 83 leaves the chamber 80 near its top and extends back to the radiator (not shown). By this arrangement hot water is forced through the chamber 80 so that about one-half of the wall of the mixing chamber can be heated at the point of evaporization. As the expansion of oil has a tendency to reduce the temperature within the carbureter and retard evaporization, which is more noticeable during the winter months, the effects produced by this chilling can be largely overcome by the heat producing properties of the water passing through the chamber 80 which, in addition, also assists and stimulates the action of the vaporization of the oil, so that the efficiency of the carbureter is maintained.

It will be noted in the foregoing description that I have provided a simple and efficient means to overcome the wear on the pivotal bearings supporting the float, so that the float can be maintained in its proper normal position to insure a constant and uniform oil level within the float chamber, and prevent flooding, which is of the greatest importance in carbureter construction.

Having thus described my said invention, what I desire to secure by Letters Patent, is—

1. A float feed mechanism consisting of a movable float, a valve actuated by said float, a U-shaped support for supporting the float, said support being provided with threads on one of its free ends and the remaining end acting as a guide to prevent said support from turning, and means engaging the threads on the support for imparting vertical travel to the latter.

2. A float feed mechanism consisting of a movable float, a valve actuated by said float, a U-shaped support for supporting the float, said support being provided with threads on one of its free ends and the remaining end providing a guide to prevent said support from turning, a gear wheel engaging the threads on the support for imparting vertical travel to the latter and provided with teeth in its peripheral surface, and a screw-shaft for rotating said gear wheel.

3. A float feed mechanism consisting of a movable float, a valve actuated by said float, a U-shaped support for supporting the float, said support being provided with threads on one of its free ends and the remaining end providing a guide to prevent said support from turning, a gear wheel engaging the threads on the support for imparting vertical travel to the latter and provided with teeth in its peripheral surface, a screw-shaft for rotating said gear wheel, and means for locking said screw-shaft in position.

4. A float feed mechanism consisting of a movable float, a valve actuated by said float, a U-shaped support for supporting the float, said support being provided with threads on one of its free ends and the remaining end providing a guide to prevent said support from turning, a gear wheel engaging the threads on the support for imparting vertical travel to the latter and provided with teeth in its peripheral surface, a screw-shaft for rotating said gear wheel, means for locking said screw-shaft in position, and means to prevent said screw-shaft from moving longitudinally.

In witness whereof, I, have hereunto set my hand and seal at Indianapolis, Indiana, this, 30th day of July, A. D. one thousand nine hundred and nine.

MARTIN C. BRIGHT. [L. S.]

Witnesses:
F. W. WOERNER,
L. B. WOERNER.

Copies of this patent may be obtained for five cents each, by addressing the "Commissioner of Patents, Washington, D. C."